(12) United States Patent
Ohira et al.

(10) Patent No.: US 6,309,618 B1
(45) Date of Patent: Oct. 30, 2001

(54) METHOD FOR TREATING EXHAUST GAS CONTAINING FLUORINE-CONTAINING INTERHALOGEN COMPOUND, AND TREATING AGENT AND TREATING APPARATUS

(75) Inventors: Manabu Ohira, Tokyo; Junichi Torisu, Kawasaki; Yasuyuki Hoshino, Kawasaki; Yuji Sakai, Kawasaki, all of (JP); Andrei S. Kuznetsov, Saint-Petersburg (RU)

(73) Assignee: Showa Denko K. K., Tokyo (JP)

( * ) Notice: Subject to any disclaimer, the term of this patent is extended or adjusted under 35 U.S.C. 154(b) by 0 days.

(21) Appl. No.: 09/429,278

(22) Filed: Oct. 28, 1999

Related U.S. Application Data
(60) Provisional application No. 60/129,323, filed on Apr. 14, 1999.

(30) Foreign Application Priority Data

Mar. 12, 1999 (JP) .................................................. 11-067125

(51) Int. Cl.[7] .............................. C01B 7/00; B01D 47/00; B01D 50/00; C01D 3/02; C09K 3/00
(52) U.S. Cl. .................... 423/240 R; 423/210; 423/490; 423/497; 423/240 S; 252/189; 252/192; 422/168; 588/900; 588/901
(58) Field of Search .................... 423/210, 240 R, 423/490, 497, 240 S; 252/189, 192; 422/168; 588/900, 901

(56) References Cited

U.S. PATENT DOCUMENTS 3,998,180 * 12/1976 Hawkins et al. ........................ 118/5
4,465,655 * 8/1984 Geisler et al. ........................ 423/240
4,472,363 * 9/1984 Poller et al. ........................... 423/240
5,670,445 * 9/1997 Kitahara et al. ...................... 502/406
5,756,060 * 5/1998 Otsuka et al. .................... 423/240 R
5,882,615 * 3/1999 Fukuda et al. .................... 423/240 S
6,022,489 * 2/2000 Izumikawa et al. ............. 252/182.32

FOREIGN PATENT DOCUMENTS

| | | | |
|---|---|---|---|
| 61-101231 | 5/1986 | (JP) | B01D/53/34 |
| 62-152519 | 7/1987 | (JP) | B01D/53/34 |
| 3-217217 | 9/1991 | (JP) | B01D/53/34 |
| 3-229618 | 10/1991 | (JP) | B01D/53/34 |
| 4-94723 | 3/1992 | (JP) | B01D/53/34 |
| 6-7637 | 1/1994 | (JP) | B01D/53/34 |
| 8-215538 | 8/1996 | (JP) | B01D/53/68 |
| 8-215539 | 8/1996 | (JP) | B01D/53/68 |
| 9-234336 | 9/1997 | (JP) | B01D/53/68 |

\* cited by examiner

Primary Examiner—Steven P. Griffin
Assistant Examiner—Jonas N. Strickland
(74) Attorney, Agent, or Firm—Sughrue, Mion, Zinn, Macpeak & Seas, PLLC

(57) ABSTRACT

A treating method comprising contacting a fluorine-containing interhalogen compound first with a treating agent for the fluorine component and then with a treating agent for the halogen component, treating agents therefor, and a method for treating exhaust gas containing a fluorine-containing interhalogen compound, comprising filling a treating agent for the fluorine component into the internal cylinder of a treating apparatus having a double cylinder structure consisting of an internal cylinder and an external cylinder, filling a treating agent for the halogen component into the external cylinder, feeding exhaust gas containing a fluorine-containing interhalogen compound into the internal cylinder to travel the internal cylinder and the external cylinder in this order, and then discharging the treated gas from the external cylinder.

13 Claims, 5 Drawing Sheets

METHOD FOR TREATING EXHAUST GAS CONTAINING FLUORINE-CONTAINING INTERHALOGEN COMPOUND, AND TREATING AGENT AND TREATING APPARATUS

CROSS REFERENCE TO RELATED APPLICATIONS

This application is an application filed under 35 U.S.C. §111 (a) claiming benefit pursuant to 35 U.S.C. §119(e)(1) of the filing date of the Provisional Application 60/129,323, filed Apr. 14, 1999, pursuant to 35 U.S.C. §111(b).

BACKGROUND OF THE INVENTION

1. Technical Field

The present invention relates to a method for treating exhaust gas containing a fluorine-containing interhalogen compound, and a treating agent and a treating apparatus therefor. More specifically, the present invention relates to a method for treating exhaust gas containing a fluorine-containing interhalogen compound, capable of efficiently and safely treating exhaust gas containing a fluorine-containing interhalogen compound gas discharged in the production of a semiconductor or a thin-film transistor liquid crystal display device, and also relates to a treating agent and a treating apparatus for use in the method.

2. Description of the Related Art

The thin-film formation process is common in the fields of producing semiconductors, thin-film transistor liquid crystal display devices and the like. Accompanying this, a dry cleaning gas is used in large amounts in thin-film forming apparatuses. Among these dry cleaning gases, use of fluorine-containing interhalogen compound gas is abruptly growing because it can be used in non-plasma condition and has no global warming effect.

However, the fluorine-containing interhalogen compound gas is highly toxic and dangerous. Therefore, the exhaust gas containing a fluorine-containing interhalogen compound gas must be detoxified and the various treatments described below have been heretofore proposed.

JP-A-3-217217 (the term "JP-A" as used herein means an "unexamined published Japanese patent application") discloses a wet treating method of washing the gas with a mixed aqueous solution of an alkali and a sulfite or bisulfite and a dry treating method of contacting the gas with a solid neutralizer and a solid sulfite or bisulfite. JP-A-3-229618 discloses a dry treating method of contacting the gas with an iron oxide at an ordinary temperature and a dry treating method of contacting the gas with an iron oxide at an ordinary temperature and then contacting it with an alkali agent.

JP-A-4-94723 discloses a dry treating method of contacting the gas with a solid alkali and an adsorbent. JP-A-6-7637 discloses a dry treating method of contacting the gas with a purifying agent comprising a soda lime having supported thereon a copper (II) compound.

Furthermore, a dry treating method of reacting the gas with a mixture of calcium hydroxide and potassium hydroxide to fix it as a solid halide (JP-A-8-215538) and a dry treating method of reacting the gas with a mixture of three compounds of calcium hydroxide, sodium hydroxide and potassium hydroxide to fix it as a solid halide (JP-A-8-215539) are disclosed.

In addition, JP-A-9-234336 discloses a dry treating method of contacting the gas with a purifying agent obtained by adding and adsorbing sodium thiosulfate to a metal oxide mainly comprising copper (II) oxide and manganese (IV) oxide.

However, the above-described wet treating methods as methods for treating a fluorine-containing interhalogen compound gas are disadvantageous in that a wastewater treatment is essentially required after the treatment, which not only makes the apparatus complicated and large-sized but also adds a huge cost for the equipment and maintenance.

Among the dry treating methods, the methods of contacting the gas with a solid alkali such as soda lime (mixture of calcium hydroxide and sodium hydroxide), calcium hydroxide, sodium hydroxide or potassium hydroxide have problems in that the treatment is highly dangerous because the reaction yields a large calorific value, the risk of the solid alkali dissolving or being deliquesced by the water generated in the reaction of a fluorine-containing interhalogen compound with the solid alkali and thereby blocking the treating cylinder having filled therein the processing agent is high, and the treating capability greatly decreases when the solid alkali is dried.

The method of contacting the gas with a sulfite, a bisulfite or an oxide of iron, manganese or copper has a problem that the treating capacity per unit volume of the treating agent is small.

Accordingly, the object of the present invention is to provide a method for treating exhaust gas containing a fluorine-containing interhalogen compound, favored with high treating capacity per the unit volume of the treating agent, high safety with a small calorific value and a low risk of the treating cylinder being blocked due to generation of water, and no reduction in the treating capacity when the treating agent is dried, and to also provide a treating agent and a treating apparatus therefor.

SUMMARY OF THE INVENTION

As a result of extensive investigations to overcome the above-described problems, the present inventors have found that an alkaline earth metal carbonate selectively and efficiently reacts with the fluorine component of a fluorine-containing interhalogen compound while yielding a small calorific value at the reaction and also while not producing water, and the remaining halogen liberated by the reaction between the fluorine-containing interhalogen compound and the alkaline earth metal carbonate can be efficiently treated with an alkali metal carbonate.

More specifically, it has been found that in the dry treating method of fixing or capturing exhaust gas containing a fluorine-containing interhalogen compound with a metal compound such as a metal fluoride and a metal halide, if the fluorine component and the remaining halogen component are simultaneously treated, the calorific value at the reaction is very large, however, when the fluorine component and the remaining halogen component are separately treated by contacting these components with respective treating agents, heat generation at the treatment can be suppressed and the treating capacity per the unit volume of the treating agent can be improved. Furthermore, when the reacting agent for the fluorine component, yielding a large calorific value at the treatment, is filled into the internal cylinder of a treating apparatus having a double cylinder structure, the treating agent for the halogen component, yielding a small calorific value, is filled in the external cylinder, and the exhaust gas containing a fluorine-containing interhalogen compound is allowed to travel from the internal cylinder to the external cylinder, the exhaust gas containing a fluorine-containing interhalogen compound can be efficiently and safely treated while suppressing the effect by the heat generation. The present invention has been accomplished based on these findings.

JP-A-3-229618 discloses a method of first contacting a gas containing chlorine trifluoride with an iron oxide to fix the exhaust gas component as an iron fluoride or chloride and then removing the gaseous fluoride or chloride generated as a by-product using an alkali agent. Furthermore, JP-A-4-94723 discloses a method of contacting a gas containing chlorine trifluoride with a solid alkali agent to fix most of fluorine and chlorine and then removing a very slight amount of chlorine not fixed using a chlorine gas adsorbent. However, the method of separately fixing the fluorine component and the halogen component of a fluorine-containing interhalogen compound such as chlorine trifluoride using treating agents which selectively react with respective components, as a metal fluoride and a metal halide is heretofore not known and is a truly novel method.

More specifically, the present invention provides the following methods (1) to (17).

(1) A method for treating exhaust gas containing a fluorine-containing interhalogen compound, comprising first contacting a fluorine-containing interhalogen compound with a treating agent for the fluorine component and then contacting the resultant treated exhaust gas with a treating agent for the halogen component.

(2) The method for treating exhaust gas containing a fluorine-containing interhalogen compound as described in (1) above, wherein the treating agent for the fluorine component comprises an alkaline earth metal carbonate and a metal hydroxide.

(3) The method for treating exhaust gas containing a fluorine-containing interhalogen compound as described in (1) above, wherein the treating agent for the halogen component comprises an alkali metal carbonate and/or hydrogencarbonate.

(4) A method for treating exhaust gas containing a fluorine-containing interhalogen compound, comprising filling a treating agent for the fluorine component into the internal cylinder of a treating apparatus having a double cylinder structure consisting of an internal cylinder and an external cylinder, filling a treating agent for the halogen component into the external cylinder, feeding exhaust gas containing a fluorine-containing interhalogen compound into the internal cylinder to pass through the internal cylinder and the external cylinder in sequence, and discharging the gas from the external cylinder.

(5) A treating agent for a fluorine component for use in the method for treating exhaust gas containing a fluorine-containing interhalogen compound described in (1) above, comprising an alkaline earth metal carbonate and a metal hydroxide.

(6) The treating agent for a fluorine component as described in (5) above, wherein the alkaline earth metal carbonate is calcium carbonate and/or magnesium carbonate, and the metal hydroxide is one or more selected from calcium hydroxide, sodium hydroxide, potassium hydroxide and aluminum hydroxide.

(7) The treating agent for a fluorine component as described in (5) or (6) above, wherein the ratio of the alkaline earth metal carbonate to the metal hydroxide contained is from 1:1 to 99:1 by weight.

(8) A treating agent for a halogen component for use in the method for treating exhaust gas containing a fluorine-containing interhalogen compound described in (1) above, comprising an alkali metal carbonate and/or hydrogencarbonate.

(9) The treating agent for a halogen component as described in (8) above, wherein the alkali metal carbonate is sodium carbonate and/or potassium carbonate, and the alkali metal hydrogencarbonate is sodium hydrogencarbonate and/or potassium hydrogencarbonate.

(10) The treating agent for a halogen component as described in (8) or (9) above, wherein the ratio of the alkali metal carbonate and/or hydrogen-carbonate contained is 60 wt % or more.

(11) A treating agent for exhaust gas containing a fluorine-containing interhalogen compound, comprising a treating agent for a fluorine component described in any one of (5) to (7) above and a treating agent for a halogen component described in any one of (8) to (10) above.

(12) An apparatus for treating exhaust gas containing a fluorine-containing interhalogen compound, comprising a double cylinder structure consisting of an internal cylinder for housing a treating agent for a fluorine component and an external cylinder for housing a treating agent for a halogen component and having an inlet for introducing exhaust gas into the internal cylinder, a path for the exhaust gas to travel from the internal cylinder to the external cylinder and an outlet for discharging the treated exhaust gas from the external cylinder.

(13) The apparatus for treating exhaust gas containing a fluorine-containing interhalogen compound as described in (12) above, wherein the ratio of the fluorine component treating agent filled in the internal cylinder to the halogen component treating agent filled in the external cylinder is from 1:0.5 to 1:3 by volume.

(14) The apparatus for treating exhaust gas containing a fluorine-containing interhalogen compound as described in (13) above, wherein said alkaline earth metal carbonate is calcium carbonate and/or magnesium carbonate, and the metal hydroxide is one or more selected from calcium hydroxide, sodium hydroxide, potassium hydroxide and aluminum hydroxide.

(15) The apparatus treating exhaust gas containing a fluorine-containing interhalogen compound as described in (13) or (14) above, wherein the ratio of the alkaline earth metal carbonate to the metal hydroxide contained is from 1:1 to 99:1 by weight.

(16) The apparatus for treating exhaust gas containing a halogen-containing interhalogen compound as described in (13) above, wherein the alkali metal carbonate is sodium carbonate and/or potassium carbonate, and the alkali metal hydrogencarbonate is sodium hydrogen-carbonate and/or potassium hydrogencarbonate.

(17) The apparatus treating exhaust gas containing a halogen-containing interhalogen compound as described in (13) or (16) above, wherein the ratio of the alkali metal carbonate and/or hydrogencarbonate contained is 60 wt % or more.

DESCRIPTION OF THE PREFERRED EMBODIMENTS

Figure 1A:
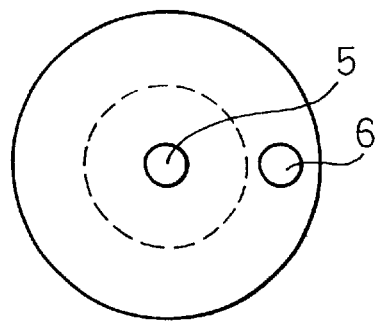
FIGS. 1A and 1B show a plan and a cross-sectional view of the double cylinder structure according to the present invention.

The fluorine-containing interhalogen compound, which is treated by the method for treating exhaust gas, the treating agent and the treating apparatus of the present invention, includes chlorine fluoride such as ClF, $ClF_3$ and $ClF_5$, bromine fluoride such as BrF, $BrF_3$ and $BrF_5$, and iodine fluoride such as $IF_3$, $IF_5$ and $IF_7$. The present invention is suitable for the treatment of exhaust gas containing a chlorine fluoride such as chlorine trifluoride, or a bromine fluoride such as bromine trifluoride, used in the dry cleaning of a thin-film forming apparatus in fields such as production of a semiconductors or thin-film transistor liquid crystal display devices.

The present invention is described below. In the following, the method for treating an exhaust gas containing a fluorine-containing interhalogen compound, and the treating agent and treating apparatus therefor, are described by referring to chlorine trifluoride as a representative example of the fluorine-containing interhalogen compound.

Heretofore, solid alkalis such as soda lime (a mixture of calcium hydroxide and sodium hydroxide) and calcium hydroxide are used as the treating agent for simultaneously treating the fluorine component and the halogen component of a fluorine-containing interhalogen compound such as chlorine trifluoride.

In the case where calcium hydroxide is used as the solid alkali and reacted with chlorine trifluoride, the reaction and the heat of reaction per mol of chlorine trifluoride become as follows:

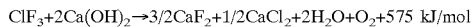

$ClF_3 + 2Ca(OH)_2 \rightarrow 3/2CaF_2 + 1/2CaCl_2 + 2H_2O + O_2 + 575$ kJ/mol

The above-described treatment by a metal hydroxide such as calcium hydroxide is advantageous in that the fluorine component and the other halogen component of a fluorine-containing interhalogen compound can be simultaneously treated, however, the treatment still suffers from large heat generation during the treatment, a high risk of trouble such as blocking of the treating cylinder due to dissolving or deliquescing of the treating agent caused by the generation of water in 2 mol per mol of, for example, chlorine trifluoride, or great reduction in the processing capacity when the treating agent is dried.

On the other hand, according to the present invention, an alkaline earth metal carbonate and a metal hydroxide can be used as the treating agent for the fluorine component of a fluorine-containing interhalogen compound, and an alkali metal carbonate and/or hydrogencarbonate can be used as the treating agent of the remaining halogen component of a fluorine-containing interhalogen compound. Here, the treating agent for the fluorine component can selectively or preferentially treats the fluorine component in a fluorine-containing halogen component, but does not necessarily treats the fluorine component in an efficiency of 100%.

Therefore, the treating agent for the remaining halogen component may treat not only the halogen other than fluorine, but also treat the fluorine or fluorine-containing interhalogen compounds.

The treatment of a fluorine-containing interhalogen compound using a carbonate of an alkaline earth metal is advantageous in that only the fluorine component of a fluorine-containing interhalogen compound can be selectively reacted and fixed or captured, moreover, the treatment is not accompanied by the generation of a large amount of heat and water is not produced.

In the case where, for example, calcium carbonate is used as the treating agent for the fluorine component of chlorine trifluoride, the reaction and the heat of reaction per mol of chlorine trifluoride become as follows:

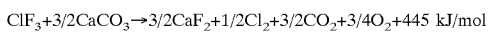

$ClF_3 + 3/2CaCO_3 \rightarrow 3/2CaF_2 + 1/2Cl_2 + 3/2CO_2 + 3/4O_2 + 445$ kJ/mol It is seen that when the fluorine component of chlorine trifluoride is treated using calcium carbonate, the heat of reaction is small by about 130 kJ/mol as compared with the simultaneous treatment of the fluorine component and the chlorine component of chlorine trifluoride using calcium hydroxide.

The halogen liberated by the reaction of an alkaline earth metal carbonate with a fluorine-containing interhalogen compound, may be adsorbed using a conventional adsorbent such as activated carbon or zeolite. The liberated halogen here means the halogen other than the fluorine component of the interhalogen compound but, if the fluorine component is still present, the halogen to be adsorbed here includes the fluorine component. However, there is a risk of the adsorbed halogen desorbing due to the purge gas of the processing cylinder or when activated carbon is used, a risk of the activated carbon reacting with fluorine-containing interhalogen compound and causing combustion or explosion. Thus, use of the adsorbent such as activated carbon or zeolite is not preferred.

The halogen liberated is preferably treated as in the present invention using an alkali metal carbonate and/or hydrogencarbonate, thereby fixing or capturing it as an alkali metal halide. For example, when sodium carbonate is used as the treating agent for the chlorine component, the reaction and the heat of reaction per the chlorine corresponding to 1 mol of chlorine trifluoride become as follows:

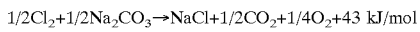

$1/2Cl_2 + 1/2Na_2CO_3 \rightarrow NaCl + 1/2CO_2 + 1/4O_2 + 43$ kJ/mol

It is seen that when the chlorine component of chlorine trifluoride is treated using sodium carbonate, the heat of reaction is very small as compared with the heat of reaction at the treatment of the fluorine component of chlorine trifluoride.

In the treatment of the halogen component of a fluorine-containing interhalogen compound by an alkali metal carbonate and/or hydrogencarbonate, the reactivity with the halogen component may be increased by adding an appropriate amount of water and thereby the treating capacity per the unit volume of the treating agent can be improved. In this case, however, if water is added in excess of the necessary amount, water may be liberated at the reaction with the halogen component, as a result, the treating agent may deliquesce and block the treating cylinder.

When sodium carbonate is used for treating, the chlorine component of chlorine trifluoride, for example, the effect of the addition of water in the treatment of the halogen component of a fluorine-containing interhalogen compound by an alkali metal carbonate and/or hydrogencarbonate is presumed to yield a catalytic effect as shown by the reaction below:

$$2Cl_2 + H_2O \rightarrow 2HCl + 1/2 O_2$$

$$2HCl + Na_2CO_3 \rightarrow 2NaCl + CO_2 + H_2O$$

The water may be added as an adsorbed water or crystal water of the treating agent for the halogen component of a fluorine-containing interhalogen compound, however, in this case, the added water may evaporate during use or storage and the treating capacity of the treating agent for the halogen component of a fluorine-containing interhalogen compound may decrease. Therefore, it is preferred to previously add a metal hydroxide, in an amount enough to produce a preferred amount of water, to the treating agent for the fluorine component of a fluorine-containing interhalogen compound within the range of not extremely increasing heat generation at the treatment and to use the water produced by the reaction with the fluorine component of a fluorine-containing interhalogen compound as a catalyst in the subsequent treatment of the halogen component. At this time, the treating capacity of the treating agent for the halogen component is more improved by adding the metal hydroxide to the treating agent for the fluorine component of a fluorine-containing interhalogen compound than by adding it to the treating agent for the halogen component because the water generated at the treatment can be effectively used.

Examples of the alkaline earth metal carbonate used in the treating agent for the fluorine component of a fluorine-containing interhalogen compound of the present invention include beryllium carbonate, magnesium carbonate, calcium carbonate, strontium carbonate and barium carbonate. Among these, calcium carbonate and magnesium carbonate are preferred. These alkaline earth metal carbonates may be used individually or two or more thereof may be used by mixing them at an optional ratio.

The metal hydroxide used in the treating agent for the fluorine component of a fluorine-containing interhalogen compound of the present invention is not particularly limited as long as it generates water at the reaction with the fluorine component. Preferred examples thereof include alkali metal hydroxides such as sodium hydroxide and potassium hydroxide, alkaline earth metal hydroxides such as calcium hydroxide, and metal hydroxides such as aluminum hydroxide. These can be used without reducing the treating capacity of the treating agent for the fluorine component. These hydroxides can be used individually or two or more thereof may be used by mixing them at an optional ratio.

In the treating agent for the fluorine component of the present invention, the ratio of the alkaline earth metal carbonate to the metal hydroxide contained is suitably from 1:1 to 99:1 by weight, preferably from 3:2 to 99:1, more preferably from 4:1 to 19:1.

Examples of the alkali metal carbonate used in the treating agent for the halogen component of a fluorine-containing interhalogen compound of the present invention include lithium carbonate, sodium carbonate, potassium carbonate, rubidium carbonate and cesium carbonate. Examples of the alkali metal hydrogencarbonate include sodium hydrogencarbonate, potassium hydrogencarbonate, rubidium hydrogencarbonate and cesium hydrogencarbonate. Among these carbonates, sodium carbonate and potassium carbonate are preferred, and among these hydrogencarbonates, sodium hydrogencarbonate and potassium hydrogencarbonate are preferred. These alkali metal carbonates and/or hydrogencarbonates may be used individually or two or more thereof may be used by mixing them at an optional ratio.

In order to improve the formability at the formation of the exhaust gas treating agent of the present invention, a binder component such as aluminum oxide, silicon oxide, magnesium oxide or calcium sulfate may be added within the range of not affecting the performance of the treating agent. In this case, the ratio of the alkali metal carbonate and/or hydrogencarbonate contained is preferably 60 wt % or more, more preferably 80 wt % or more, based on the treating agent.

The treating agent for exhaust gas containing a fluorine-containing interhalogen compound of the present invention is preferably used in a particle size of approximately from 0.5 to 10 mm, more preferably on the order of from 1 to 5 mm. To obtain such a dimension, the treating agent is usually formed before use. Examples of the method for forming the treating agent include an extrusion forming method, a tablet forming method and a method of pulverizing the treating agent formed by the extrusion forming method or the tablet forming method.

In the treating agent for exhaust gas containing a fluorine-containing interhalogen compound of the present invention, the ratio of the treating agent for the fluorine component to the treating agent for the halogen component may be in terms of the volume ratio from 1:0.5 to 1:3, preferably on the order of from 1:1 to 1:2. If the volume ratio is more than 1:0.5, the amount of the treating agent for the halogen component is insufficient in comparison with the amount of the treating agent for the fluorine component and the halogen component after the treatment of a fluorine-containing interhalogen compound with a treating agent for the fluorine component cannot be satisfactorily treated, whereas if it is less than 1:3, the treating agent for the halogen component becomes excess and the fluorine component of the fluorine-containing interhalogen compound cannot be sufficiently treated.

The treating agent for exhaust gas containing a fluorine-containing interhalogen compound of the present invention exhibits a sufficiently high treating capacity at an ordinary temperature, accordingly, heating is not particularly necessary and the treating agent may be used in the vicinity of an ordinary temperature (from 5 to 40° C.).

The concentration of the fluorine-containing interhalogen compound in the objective gas treated may be usually from 0.01 to 10 vol %. The flow velocity of the objective gas treated in usual is preferably from 0.1 to 5 m/s in terms of the normal linear velocity (LV).

The treating apparatus for a fluorine-containing interhalogen compound of the present invention is described below.

Figure 1B:
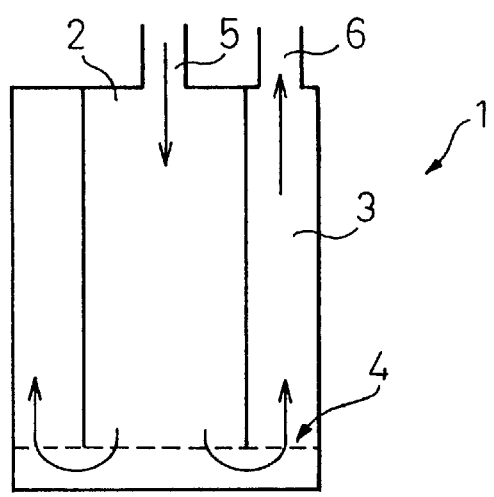

According to the present invention, as shown in FIG. 1, respective treating agents are filled into the treating cylinder having a double cylinder structure, whereby the effect of the heat generation can be suppressed and the exhaust gas containing a fluorine-containing interhalogen compound can be treated more safely. More specifically, when the treating agent for the fluorine component of a fluorine-containing interhalogen compound of the present invention is filled into the internal cylinder 2 of the treating cylinder 1 having a double cylinder structure and the treating agent for the halogen component is filled into the external cylinder 3, the treating agent for the halogen component filled into the external cylinder simultaneously plays a part as a heat insulating material because the calorific value at the treatment of the halogen component is small. In FIGS. 1A and 1B showing a plan view and a cross-sectional view, a bottom for housing the treating agents of the internal cylinder 2 and the external cylinder 3 is formed using a stainless steel net 4 in the inside of the treating cylinder 1 having a double cylinder structure. An exhaust gas inlet 5 is provided at the upper portion of the internal cylinder 2 and a treated gas outlet 6 is provided at the upper portion of the external cylinder 3. In FIG. 1B, the flow of exhaust gas is shown by arrows.

The ratio of the treating agent for fluorine filled in the internal cylinder to the treating agent for halogen filled in the external cylinder is in terms of the volume ratio suitably from 1:0.5 to 1:3, preferably from 1:1 to 1:2.

The size and the aspect ratio of the treating cylinder for exhaust gas containing a fluorine-containing interhalogen compound of the present invention may be freely selected according to the amount of exhaust gas containing a fluorine-containing interhalogen compound to be treated per the unit time or the space for the installation. The exhaust gas treating agent of the present invention yields a small calorific value at the treatment of exhaust gas, therefore, when the treating agent is used by filling it into a treating cylinder having a double cylinder structure favored with a heat insulating effect, it is not particularly necessary to provide cooling equipment.

Unlike conventional treatments using a solid alkali such as soda lime, calcium hydroxide, potassium hydroxide and sodium hydroxide as the exhaust gas treating agent, the amount of water produced at the treatment of exhaust gas containing a fluorine-containing interhalogen compound is small, therefore, the exhaust gas treating agent of the present invention is not involved in any trouble such as blocking of the treating cylinder due to dissolving or deliquescing of the treating agent ascribable to water or reduction in the detoxification capacity.

Furthermore, according to the present invention, the fluorine component and the halogen component of a fluorine-containing interhalogen compound are treated by the treating agents which selectively react with respective components, therefore, as compared with conventional techniques where the fluorine component and the halogen component of a fluorine-containing interhalogen compound are simultaneously treated, the treating capacity per the unit volume of total treating agents can be improved.

In the case where the fluorine component and the halogen component of a fluorine-containing interhalogen compound are simultaneously treated by a solid alkali, for example, in the treatment of chlorine trifluoride with calcium hydroxide, the chlorine component of chlorine trifluoride is lower in the reactivity than the fluorine component and, as described below, a halogen exchange reaction takes place between the calcium chloride generated by the reaction and the chlorine trifluoride. Therefore, when the chlorine trifluoride concentration in the exhaust gas is low or the treating agent is dried, the treatment of the chlorine component proceeds insufficiently and the treating capacity extremely decreases.

$$ClF_3 + 3/2 CaCl_2 \rightarrow 3/2 CaF_2 + 2Cl_2$$

According to the treating agent and the treating method for exhaust gas containing a fluorine-containing interhalogen compound of the present invention, heat generation at the treating reaction of exhaust gas is small as compared with the simultaneous treatment of the fluorine component and the halogen component using a solid alkali, therefore, the exhaust gas containing a fluorine-containing interhalogen compound can be safely and efficiently treated.

EXAMPLES

The present invention is described in greater detail below by referring to the Examples, however, the present invention is by no means limited thereto.

Examples 1 to 3

Figure 2:
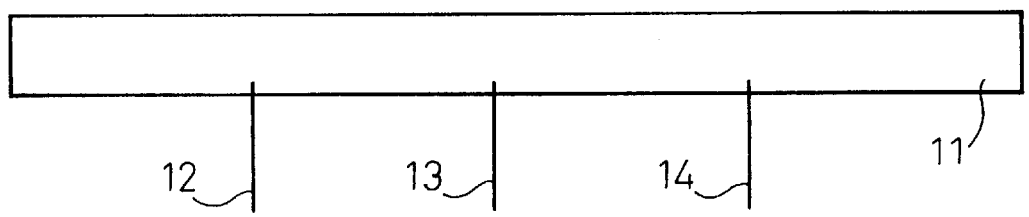
FIG. 2 shows the treating cylinder of the Examples.

A drum-type treating cylinder 11 having a bore (inner diameter) of 22 mm and a length of 1,200 mm shown in FIG. 2 was equipped with thermocouple temperature sensors 12, 13 and 14 at three points (at 300 mm, 600 mm or 900 mm from the inlet portion of the treating cylinder). 150 cc of a treating agent for fluorine component, having a composition shown in Table 1 and having a particle size of from 1 to 3 mm was filled into the inlet portion and 250 cc of a treating agent for chlorine component having a composition shown in Table 1 and having a particle size of from 1 to 3 mm was filled into the outlet portion.

Through the inlet of the treating cylinder, a gas containing chlorine trifluoride diluted with nitrogen to a concentration of 7.5 vol % flowed and traveled at a normal linear velocity of 3.0 m/min at room temperature (25° C.) under atmospheric pressure until the chlorine concentration at the outlet of the treating cylinder exceeded 1 ppm, and the amount of chlorine trifluoride treated and the maximum exothermic temperature at the treatment were determined. Then, good results, as shown in Table 2, were obtained.

TABLE 1

|  | Examples 1, 4, 7, 10 Composition (wt %) | | Examples 2, 5, 8 Composition (wt %) | | Examples 3, 6, 9 Composition (wt %) | |
| --- | --- | --- | --- | --- | --- | --- |
| treating agent for fluorine component | calcium carbonate | 95 | calcium carbonate | 90 | calcium carbonate | 80 |
|  | calcium hydroxide | 5 | calcium hydroxide | 10 | calcium hydroxide | 20 |
| treating agent for chlorine component | sodium carbonate | 90 | sodium carbonate | 90 | sodium carbonate | 90 |
|  | aluminum oxide | 10 | aluminum oxide | 10 | aluminum oxide | 10 |

TABLE 2

|  | Example 1 | Example 2 | Example 3 |
| --- | --- | --- | --- |
| Amount of chlorine trifluoride treated | 101 g | 90 g | 85 g |
| Maximum temperature | 300° C. | 310° C. | 330° C. |

Examples 4 to 6

Examples 4 to 6 were performed in the same manner as Examples 1 to 3 except that the gas containing chlorine trifluoride diluted with nitrogen flowed and traveled in the treating cylinder at a normal linear velocity of 1.4 m/min. Then, good results as shown in Table 3 were obtained.

TABLE 3

|  | Example 4 | Example 5 | Example 6 |
| --- | --- | --- | --- |
| Amount of chlorine trifluoride treated | 97 g | 84 g | 78 g |
| Maximum temperature | 160° C. | 180° C. | 200° C. |

Examples 7 to 9

Examples 7 to 9 were performed in the same manner as Examples 1 to 3 except that the gas containing chlorine trifluoride diluted with nitrogen had a chlorine trifluoride concentration of 0.7 vol % and flowed and traveled in the treating cylinder at a normal linear velocity of 1.6 m/min. Then, good results as shown in Table 4 were obtained.

TABLE 4

|  | Example 7 | Example 8 | Example 9 |
|---|---|---|---|
| Amount of chlorine trifluoride treated | 76 g | 73 g | 69 g |
| Maximum temperature | 100° C. | 105° C. | 120° C. |

Example 10

Figure 3:
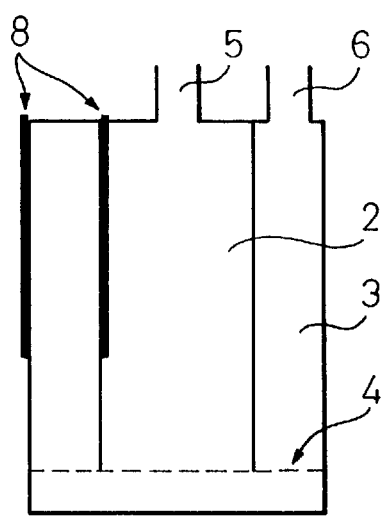
FIG. 3 shows the treating apparatus having a double cylinder structure of the Examples.

Into the internal cylinder (bore: 280 mm) and the external cylinder (bore: 460 mm) of a stainless steel-made treating cylinder (height: 800 mm, depth to the stainless steel net: 780 mm) equipped with thermocouple temperature sensors 8 on the outer surface of the external cylinder and on the internal cylinder shown in FIG. 3, 40L of a treating agent for the fluorine component and 70L of a treating agent for the chlorine component, each having a composition shown in Table 1 and having a particle size of from 3 to 5 mm, were filled.

Through the inlet of the treating cylinder, a gas containing chlorine trifluoride diluted with nitrogen to a concentration of 7.5 vol % flowed and traveled at a normal linear velocity of 1.4 m/min at room temperature (25° C.) under atmospheric pressure until the fluorine or chlorine concentration at the outlet of the treating cylinder exceeded 1 ppm, and the amount of chlorine trifluoride treated and the maximum temperature at the treatment were determined.

The amount of chlorine trifluoride treated was 25 kg. The maximum temperature of the internal cylinder was 250° C., and the maximum temperature of the external cylinder outer surface was 50° C. Thus, the effect of the treating cylinder having a double cylinder structure was verified.

Comparative Example 1

Into the treating cylinder having a bore of 22 mm and a length of 1,200 mm equipped with thermocouple temperature sensors shown in FIG. 2, 400 cc of soda lime was filled. Then, through the inlet of the treating cylinder, a gas containing chlorine trifluoride diluted with nitrogen to a concentration of 7.5 vol % flowed and traveled at a normal linear velocity of 3.0 m/min at room temperature (25° C.) under atmospheric pressure until the fluorine or chlorine concentration at the outlet of the treating cylinder exceeded 1 ppm, and the amount of chlorine trifluoride treated and the maximum exothermic temperature at the treatment were determined.

However, during the treatment, the pressure at the inlet of the treating cylinder elevated and the treating cylinder was blocked. The amount of chlorine trifluoride treated until the treating cylinder was blocked was 60 g and the maximum temperature until the treating cylinder was blocked was 400° C. or more.

Example 11

Into a drum-type treating cylinder having a bore of 22 mm and a length of 1,200 mm equipped with thermocouple temperature sensors 12, 13 and 14 at three points (at 300 mm, 600 mm or 900 mm from the inlet portion of the treating cylinder) shown in FIG. 2, only a treating agent for the fluorine component, having the same composition as in Example 1 shown in Table 1 and having also the same particle size of from 1 to 3 mm was filled in an amount of 400 ml, and the reaction of the treating agent for the fluorine component was examined.

Through the inlet of the treating cylinder, a gas containing chlorine trifluoride diluted with nitrogen to a concentration of 7.5 vol % flowed and traveled at a normal linear velocity of 1.4 m/min at room temperature (25° C.) under atmospheric pressure. The concentrations of chloride ion and fluoride ion in the gas at the outlet of the treating cylinder were measured by ion chromatography and the ratios (%) of the fluorine component and the chlorine component measured to the fluorine component and the chlorine component contained in the gas before treatment were determined. The results obtained are shown in FIG. 4.

Figure 4:
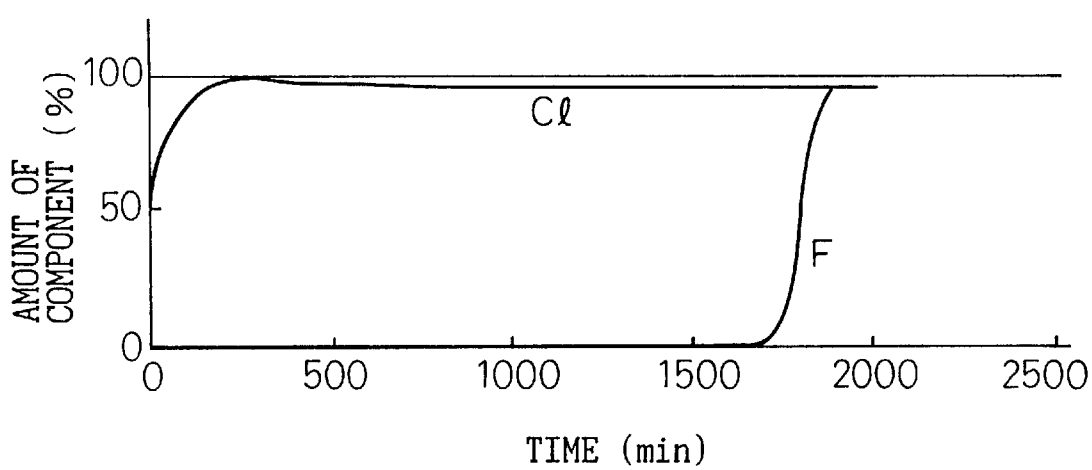
FIG. 4 is a graph showing the analysis value of the outlet gas of Example 11.

As seen from FIG. 4, the fluorine component was not contained at all in the gas at the outlet from the beginning until a certain point of time and at the certain point of time, the gas abruptly began to contain the fluorine component. From this, it was verified that only the fluorine component of chlorine trifluoride was selectively treated by the treating agent for the fluorine component. After the completion of treatment, the treating agent for the fluorine component was analyzed and found to mainly comprise calcium fluoride.

Figure 5:
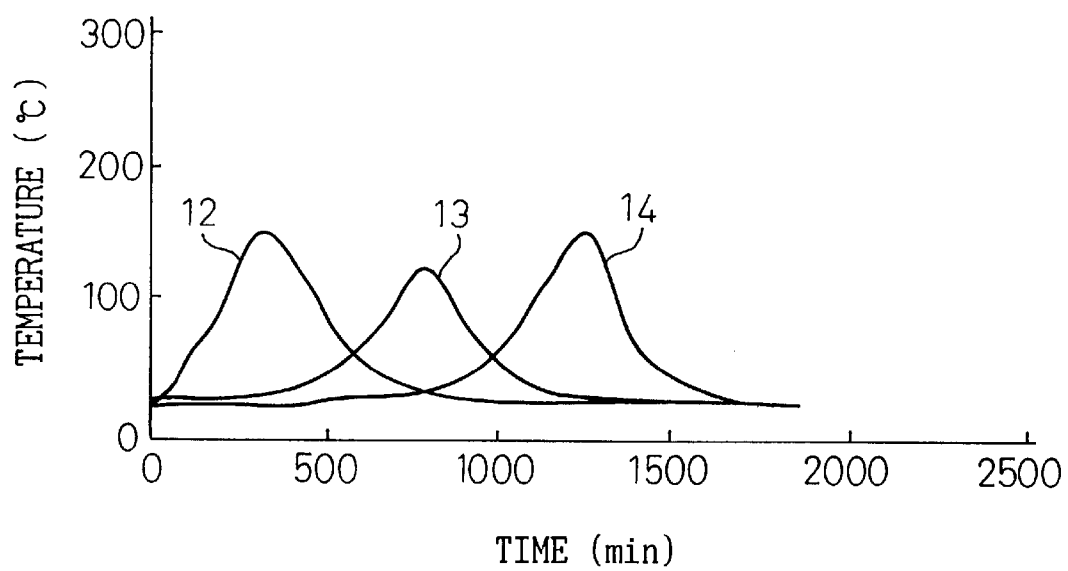
FIG. 5 is a graph showing the temperature inside the treating cylinder of Example 11.
Figure 6:
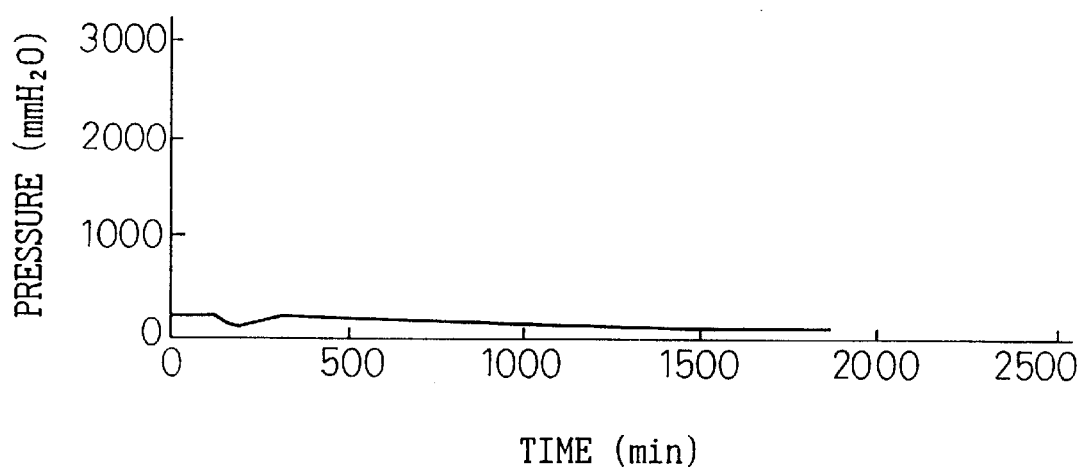
FIG. 6 is a graph showing the inlet pressure of Example 11.

The amount of chlorine trifluoride treated until the fluoride ion concentration in the gas at the outlet of the treating cylinder exceeded 1 ppm was 260 g. FIG. 5 shows temperatures of the temperature sensors 12, 13 and 14 and the maximum temperature was 150° C. As seen from FIG. 6, the pressure at the inlet of the treating cylinder was constant and from 0.01 to 0.02 kg/cm$^2$.

Comparative Example 2

In the same manner as in Example 11 except for filling 400 ml of a commercially available soda lime into the treating cylinder in place of the treating agent for the fluorine component, the concentrations of the chloride ion and fluoride ion in the gas at the outlet of the treating cylinder, the maximum temperature of each temperature sensor and the pressure at the inlet of the treating cylinder were measured. The ratios of the fluorine component and chlorine component measured to the fluorine component and chlorine component contained in the gas before the treatment were determined and shown in FIG. 7.

Figure 7:
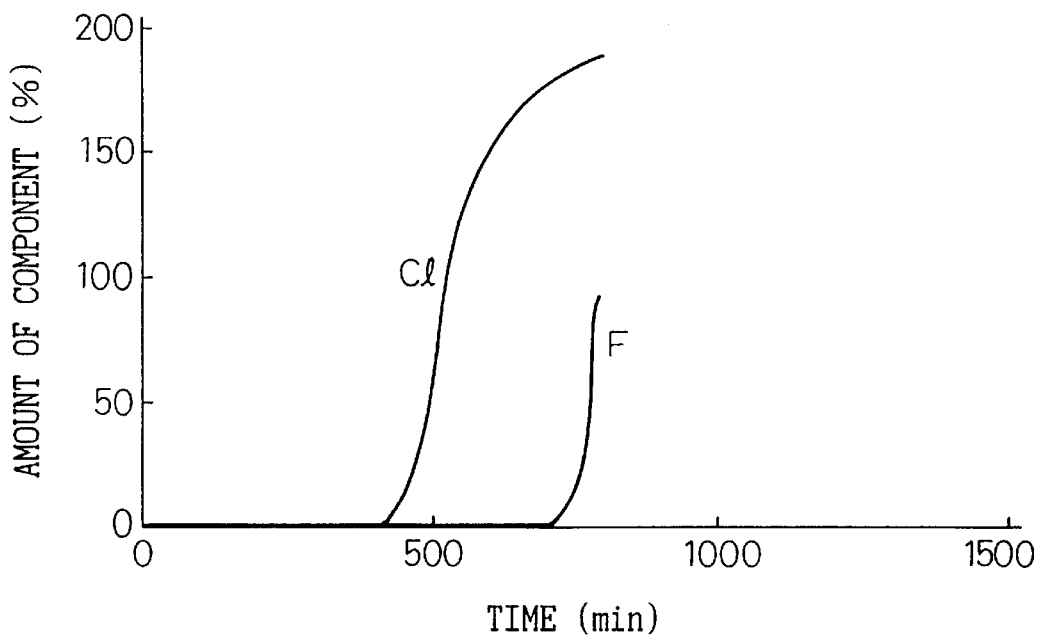
FIG. 7 is a graph showing the analysis value of the outlet gas of Comparative Example 2.
Figure 8:
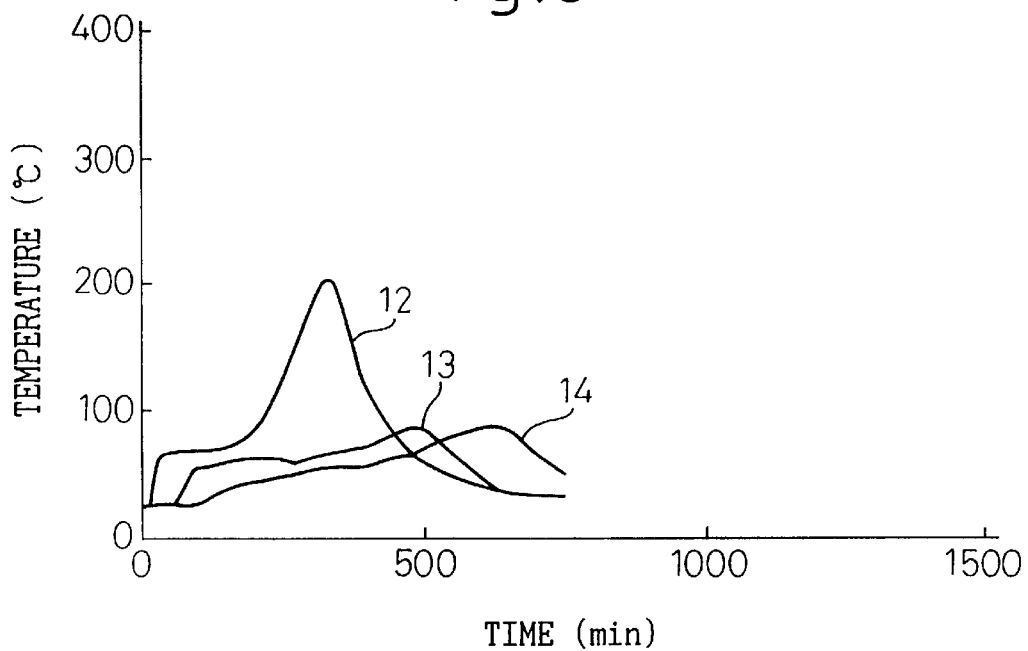
FIG. 8 is a graph showing the temperature inside the treating cylinder of Comparative Example 2.

As seen in FIG. 7, the chlorine component and the fluorine component of chlorine trifluoride were simultaneously treated from the beginning until a certain point of time, however, the chloride ion was detected at the outlet of the treating cylinder earlier than the fluoride ion.

Figure 9:
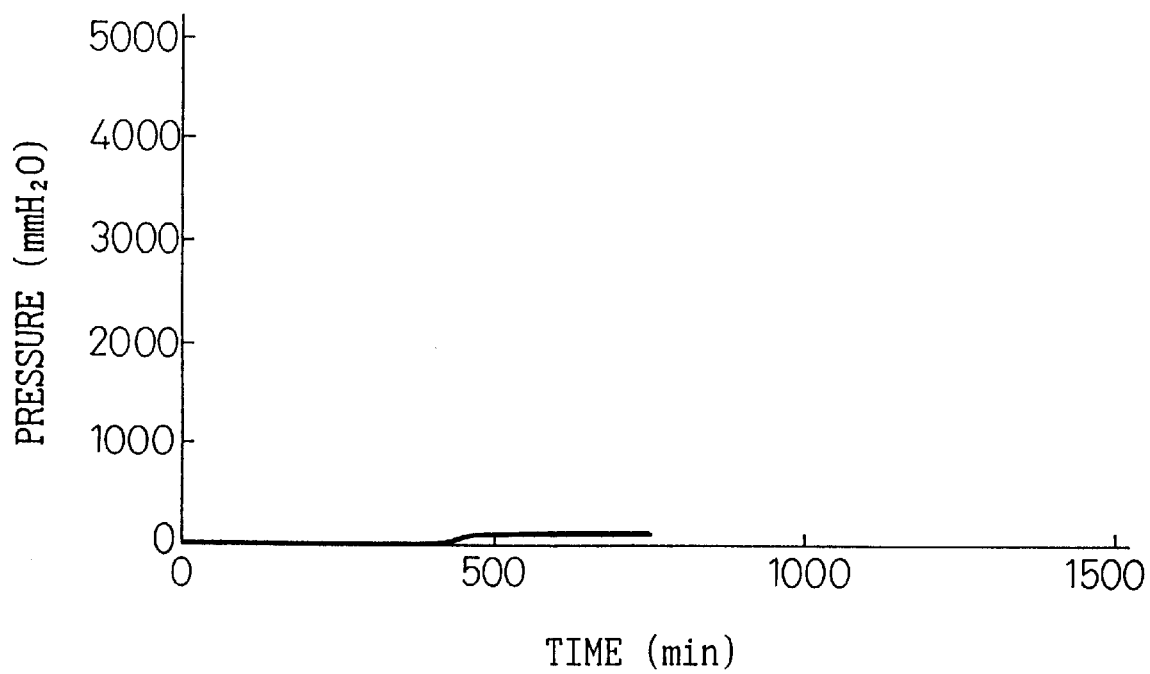
FIG. 9 is a graph showing the inlet pressure of Comparative Example 2.

The amount of chlorine trifluoride treated until the chloride ion concentration in the gas at the outlet of the treating cylinder exceeded 1 ppm was 60 g and the amount of chlorine trifluoride treated until the fluoride ion concentration exceeded 1 ppm was 110 g. As seen in FIG. 7 showing the temperatures of respective sensors, the maximum temperature was 200° C. Furthermore, as seen in FIG. 9, the pressure at the inlet of the treating cylinder was confirmed to have a tendency of increasing up to 0.02 kg/cm$^2$ with the proceeding of the treatment.

According to the method for treating exhaust gas containing a fluorine-containing interhalogen compound and the treating agent and treating apparatus therefor of the present invention, exhaust gas containing a fluorine-containing interhalogen compound can be efficiently treated without any risk of the temperature elevating due to generation of heat or the treating cylinder being blocked due to production of water. Therefore, the present invention is very useful in industry for the treatment of exhaust gas particularly containing a fluorine-containing interhalogen compound used in the dry cleaning of a thin-film forming apparatus in the fields of production of semiconductors, thin-film transistor liquid crystal devices or the like, or for emergency detoxification during leakage of a fluorine-containing interhalogen compound gas bomb.

What is claimed is:

1. A method for treating exhaust gas containing a fluorine-containing interhalogen compound, comprising first contacting the fluorine-containing interhalogen compound with a treating agent for selectively treating a fluorine component to provide a resultant treated exhaust gas and then contacting the resultant treated exhaust gas with a treating agent for treating a halogen component.

2. The method for treating exhaust gas containing a fluorine-containing interhalogen compound as claimed in claim 1, wherein said treating agent for the fluorine component comprises an alkaline earth metal carbonate and a metal hydroxide.

3. The method for treating exhaust gas containing a fluorine-containing interhalogen compound as claimed in claim 1, wherein said treating agent for the halogen component comprises an alkali metal carbonate and/or hydrogencarbonate.

4. A method for treating exhaust gas containing a fluorine-containing interhalogen compound, comprising filling a treating agent for selectively treating a fluorine component into an internal cylinder of a treating apparatus having a double cylinder structure consisting of an internal cylinder and an external cylinder, filling a treating agent for a halogen component into the external cylinder, feeding exhaust gas containing the fluorine-containing interhalogen compound into the internal cylinder to travel the internal cylinder and the external cylinder in sequence, and discharging the gas from the external cylinder.

5. The method for treating exhaust gas containing a fluorine-containing interhalogen compound as claimed in claim 4, wherein said treating agent for the fluorine component comprises an alkaline earth metal carbonate and a metal hydroxide.

6. The method for treating exhaust gas containing a fluorine-containing interhalogen compound as claimed in claim 4, wherein said treating agent for the halogen component comprises an alkali metal carbonate and/or hydrogencarbonate.

7. An apparatus for treating exhaust gas containing a fluorine-containing interhalogen compound, comprising a double cylinder structure consisting of an internal cylinder for housing a treating agent for selectively treating a fluorine component and an external cylinder for housing a treating agent for a halogen component and having an inlet for introducing exhaust gas into the internal cylinder, a path for the exhaust gas to travel from the internal cylinder to the external cylinder and an outlet for discharging the treated exhaust gas from the external cylinder.

8. The apparatus for treating exhaust gas containing a fluorine-containing interhalogen compound as claimed in claim 7, wherein a ratio of the fluorine component treating agent filled in the internal cylinder to the halogen component treating agent filled in the external cylinder is from 1:0.5 to 1:3 by volume.

9. The apparatus for treating exhaust gas containing a fluorine-containing interhalogen compound as claimed in claim 7, wherein the fluorine component treating agent comprises an alkaline earth metal carbonate and a metal hydroxide, and wherein the halogen component treating agent comprises an alkali metal carbonate and/or hydrogencarbonate.

10. The apparatus for treating exhaust gas containing a fluorine-containing interhalogen compound as claimed in claim 9, wherein said alkaline earth metal carbonate is calcium carbonate and/or magnesium carbonate, and the metal hydroxide is one or more selected from the group consisting of calcium hydroxide, sodium hydroxide, potassium hydroxide and aluminum hydroxide.

11. The apparatus treating exhaust gas containing a fluorine-containing interhalogen compound as claimed in claim 10 or 9, wherein the ratio of the alkaline earth metal carbonate to the metal hydroxide contained is from 1:1 to 99:1 by weight.

12. The apparatus for treating exhaust gas containing a halogen-containing interhalogen compound as claimed in claim 9, wherein the alkali metal carbonate is sodium carbonate and/or potassium carbonate, and the alkali metal hydrogencarbonate is sodium hydrogencarbonate and/or potassium hydrogencarbonate.

13. The apparatus treating exhaust gas containing a halogen-containing interhalogen compound as claimed in claim 12 or 9, wherein the ratio of the alkali metal carbonate and/or hydrogencarbonate contained is 60 wt % or more.

* * * * *